United States Patent [19]
Herter

[11] 3,752,434
[45] Aug. 14, 1973

[54] MOLDING OF ALL PLASTIC SHOTSHELL CASES

[75] Inventor: George L. Herter, Waseca, Minn.

[73] Assignee: Herter's Inc., Waseca, Minn.

[22] Filed: Sept. 9, 1971

[21] Appl. No.: 178,943

[52] U.S. Cl.................................. 249/105, 425/249
[51] Int. Cl............................................... B22c 9/08
[58] Field of Search.......................... 249/105, 146; 425/250, 346, 245, 247, 249, 296, 326 B, 326 BJ, 468, DIG. 5, DIG. 58; 164/132, 340, 341, 345, 346, 351; 264/328, 334

[56] References Cited
UNITED STATES PATENTS

| | | | |
|---|---|---|---|
| 2,913,762 | 11/1959 | Knowles | 425/249 |
| 2,936,481 | 5/1960 | Wilkalis | 425/249 |
| 297,712 | 4/1884 | Peters | 425/249 X |
| 3,109,201 | 11/1963 | Dulmage | 249/105 X |
| 3,225,414 | 12/1965 | Dean | 249/105 |
| 3,281,514 | 10/1966 | Polka | 425/249 X |
| 3,311,950 | 4/1967 | Strauss | 425/326 B |
| 3,394,209 | 7/1968 | Cheney | 425/326 B |
| 3,424,089 | 1/1969 | Humperson | 425/249 X |

Primary Examiner—J. Spencer Overholser
Assistant Examiner—John S. Brown
Attorney—George F. Williamson, Herman H. Baine, Malcolm L. Moore and Conrad A. Hansen

[57] ABSTRACT

A mold and molding method for all plastic shotshell cases to inject the plastic into the mold cavity from a sprue at the center of the mold cavity forming the closed end of the shotshell case and to simultaneously fill all portions of the mold cavity without necessitating forming a weld line, and maintaining the entire periphery of the shotshell case uniform in thickness by holding the core within the mold cavity concentrically of the movable mold parts with a rigid core pin on the end of the core and seated in the sprue, the core pin having grooves for carrying molten plastic into the cavity while the pin is seated in the sprue for holding the core concentric of the mold cavity.

1 Claim, 6 Drawing Figures

PATENTED AUG 14 1973 3,752,434

INVENTOR.
GEORGE L. HERTER
BY H. Dale Palmatier
ATTORNEY

3,752,434

MOLDING OF ALL PLASTIC SHOTSHELL CASES

BRIEF SUMMARY OF THE INVENTION

It has been found desirable, in molding all plastic shotshell cases, to inject the plastic into the mold cavity at the end of the cavity forming the closed end of the shotshell case and approximately at the location of the primer pocket. As a result of the molding, the primer pocket opening usually has to be reamed or adjusted slightly in size, and the injection of plastic at this location allows the case to be formed without any weld lines between adjoining plastic areas during filling of the cavity.

In order to hold the sidewall of the shotshell case uniform thickness throughout its entire periphery, the core of the mold must be precisely concentric with the walls of the mold parts defining the exterior periphery of the cavity. According to the present invention, this is accomplished by affixing a rigid pin at the end of the core, the pin having longitudinally extending grooves in the periphery thereof, and the pin being slightly tapered. This pin is seated in the tapered sprue and plastic is injected into the mold cavity through the grooves while the pin and sprue hold the core concentric within the mold cavity.

DETAILED DESCRIPTION OF THE INVENTION

Figure 1:
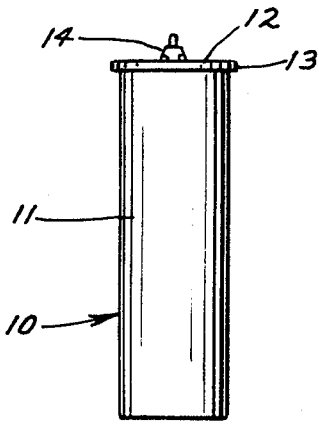
FIG. 1 is an elevation view of an all plastic shotshell case as it comes out of the mold according to the present invention.
Figure 2:
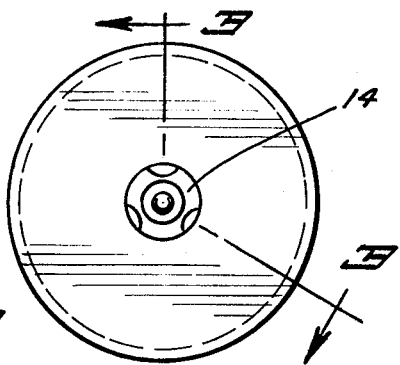
FIG. 2 is an enlarged detail end elevation view of the all plastic shotshell case.

One form of the invention is shown in the drawings and is described herein. The all plastic shotshell case is indicated in general in FIG. 1 by the numeral 10 and has a peripheral sidewall 11 and a base 12, and an ejection rim 13. The shotshell case 10 has a bridging structure 14 remaining from the formation of the shotshell case in the molding of the case. This bridging structure 14 will be removed from the base 12 and the base will be drilled and reamed for the primer pocket of the shotshell case during the next step in processing this shotshell case and prior to charging the shotshell.

Figure 3:
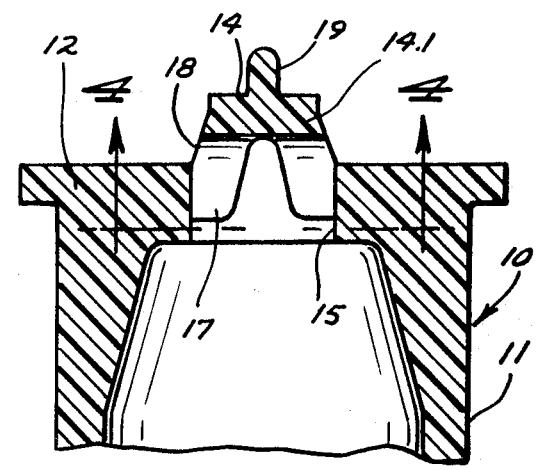
FIG. 3 is an enlarged detail section view taken along a broken line as indicated at 3—3 in FIG. 2.
Figure 4:
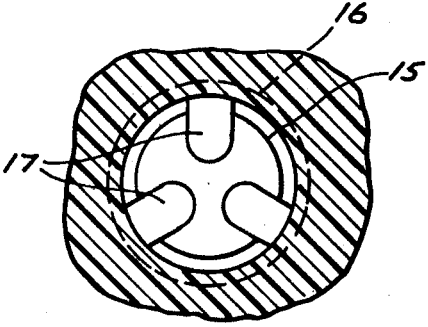
FIG. 4 is a detail section view taken approximately at 4—4 in FIG. 3.

The base 12 and sidewall 11 of the shotshell case 10 is shown in detail in FIG. 3, and the opening 15 through the base 12 is evident in this view for the primer pocket. The opening 15 will be enlarged somewhat, approximately to the size of the dotted line circle 16 indicated in FIG. 4 for properly receiving and mounting the primer of the shotshell when the shotshell is being charged. In this particular shotshell, a base wad will be inserted into the interior of the shotshell case and adjacent the base 12 for absorbing the shock of ignition of the primer, and, in some instances, for retaining the primer.

The bridging structure 14 has a plurality of radially oriented ribs 17 extending longitudinally partly throughout the thickness of the base 12 and outwardly therebeyond along open areas 18 and to a cross bridge 14.1 and to a small tit or projection 19. When the shotshell case has been completely molded, this bridge structure 14 is removed mechanically, and the opening 15 is enlarged as previously described.

Figure 5:
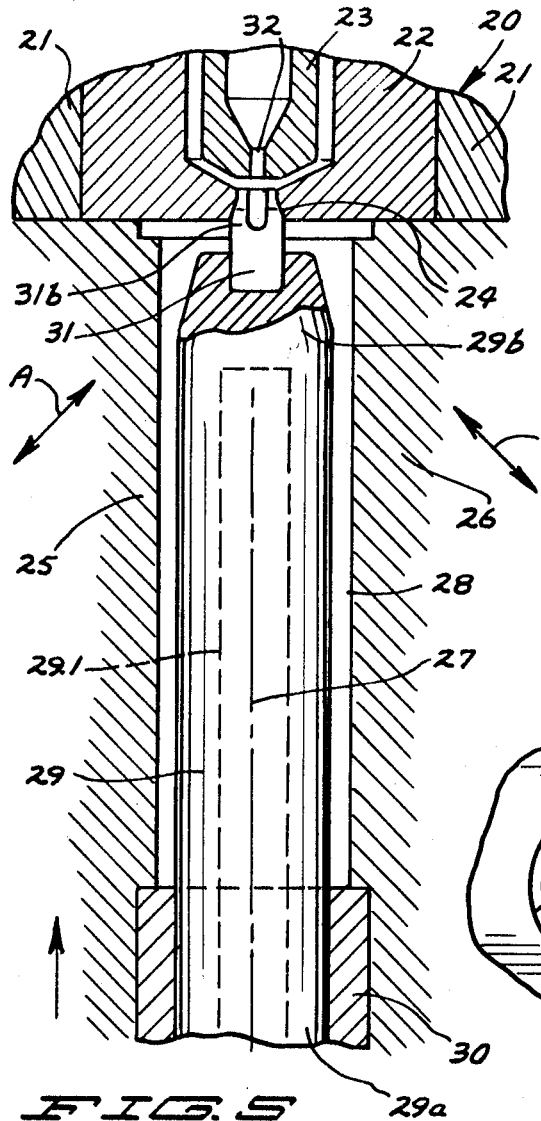
FIG. 5 is a detail section view through a mold showing the several mold parts and mold cavity for forming the all plastic shotshell case and for injecting the plastic into the mold cavity.

This shotshell case is molded by a mold assembly indicated in general by numeral 20 in FIG. 5. The mold assembly has a stationary mold part 21 carrying an insert 22 which mounts the nozzle 23. The insert 22 defines the sprue 24 through which plastic is normally injected from the nozzle 23.

The mold assembly also includes a pair of movable mold parts 25 and 26 which abut against each other at a parting line 27, shown in dotted lines, and the movable mold parts cooperatively define the exterior periphery of the generally cylindrical mold cavity 28 and the movable mold parts 25 and 26 define the exterior periphery of the shotshell case being molded. These movable mold parts 25 and 26 cooperate with the stationary mold part 21 and the insert 22 carried thereby in defining the general closed end shape of the shotshell case, and it will be noted that the insert 22 specifically defines the flat end surface of the base 12 of the molded shotshell case.

The movable mold parts 25 and 26 move generally in the direction of arrows A and B, respectively, so as to separate from each other and separate from the stationary mold part 21 when the mold is open. Accordingly, the movable mold parts 25 and 26 have a motion which is generally oblique with respect to the orientation of the shotshell case mold cavity 28.

As a part of the mold assembly 20, is a core 29 which extends up into the mold cavity 28 and defines the interior peripheral face of the mold cavity so as to define the interior periphery of the molded shotshell case when formed. The concentricity of the core 29 within the mold cavity 28 is extremely critical in order to make the shotshell case sidewall uniform throughout the entire periphery.

The rear end portion 29a of the core is firmly held against any transverse movement by an ejection sleeve 30 and the rear portions of the movable mold parts 25 and 26 after they have been locked together. The forward portion 29b of the core 29 is provided with a rigid pin 31 projecting forwardly and endwise from the core 29.

The pin 31 has a tapered outer end receivable into the sprue 24 which is identically tapered and the pin 31 seats against the peripheral surfaces of the sprue 24 when the mold assembly 20 is in closed condition as illustrated in FIG. 5. The firm seating of pin 31 in the sprue 24 positively centers and retains the core 29 and particularly the forward end 29b thereof exactly concentric of the mold cavity 28.

Figure 6:
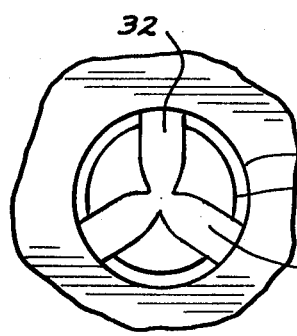
FIG. 6 is an enlarged detail end elevation view of the rigid pin of the core and seatable in the sprue.

The core pin 31 has a plurality of elongate grooves 32 extending longitudinally through both of the tapered forward portion 31a and through the cylindrical portion 31b of the pin so as to provide communication between the nozzle 23 and the mold cavity 28 so as to facilitate charging the mold cavity after the mold assembly has been closed and the pin 31 seated in the sprue 24. The grooves 32 extend across the end of the pin 31 as illustrated in FIG. 6 so as to adequately supply the grooves with plastic during charging of the mold cavity.

It will also be noted that the core 29 is provided with an interior cooling port 29.1 facilitating circulation of cooling liquid through the core to maintain the desired levels of temperatures during the molding process.

When the mold cavity has been charged with plastic and the plastic has cured, the mold assembly 20 is released and opened up by moving the mold parts 25 and 26 in the directions of arrows A and B, respectively, and the sleeve 30 is moved toward the end of the core 29 as the core 29 is retracted from the stationary mold part 21 so as to eject the formed shotshell case over the end of the core. The resulting construction in the base 12 of the shotshell case appears in FIGS. 3 and 4 wherein the ribs 17 are formed, according to where the grooves 32 were in the pin 31. The small projection 19 is that portion of the plastic which remained in the axial sprue opening beyond the end of the pin 31 in the molding process.

As previously described, the bridge portion 14 is removed and the opening 15 is enlarged by drilling and reaming so as to accommodate the primer of the shotshell.

It will be seen that I have provided a new and novel mold and method of molding for maintaining the sidewall of a shotshell case precisely uniform in thickness by maintaining the core in the mold assembly precisely concentric of the exterior periphery of the mold assembly. This concentricity is maintained by the rigid pin 31 affixed on the end of the core 29 and projecting into the sprue 24 and seating against the periphery of the sprue. The seating of the pin against the sprue causes the formation of small openings 18 in the bridge portion 14 of the resulting shotshell case. The pin 31 has grooves 32 facilitating simultaneous charging of the cavity 28 even though the sprue is partially obstructed by the pin being seated against the periphery of the sprue.

I claim:

1. An all plastic shotshell case mold comprising:

a plurality of movable parts cooperatively defining the exterior periphery of the mold cavity for the shotshell case, a stationary mold part cooperating with the movable mold part and defining the end of the mold cavity for the closed end of the shotshell case, the stationary mold part defining the sprue through which plastic is supplied into the mold cavity, and a core between the movable mold parts and within the cavity defined thereby and defining the interior periphery of the mold cavity for the shotshell case, the core having a rigid pin on the end of the core to extend into and be seated in the sprue for locating the core concentrically of the mold cavity, the rigid pin having a plurality of longitudinally oriented grooves in the periphery thereof and said pin having grooves across its end, said grooves forming ribs in the plastic mold, said longitudinally oriented grooves in the pin being spaced around the periphery of the pin to simultaneously direct plastic into all peripheral portions of the mold cavity, the sprue and pin being tapered and the pin bottoming against the sprue, and said grooves connecting the sprue with the mold cavity for directing plastic into the mold cavity while the pin is seated in the sprue.

* * * * *